United States Patent Office 2,812,828
Patented Nov. 12, 1957

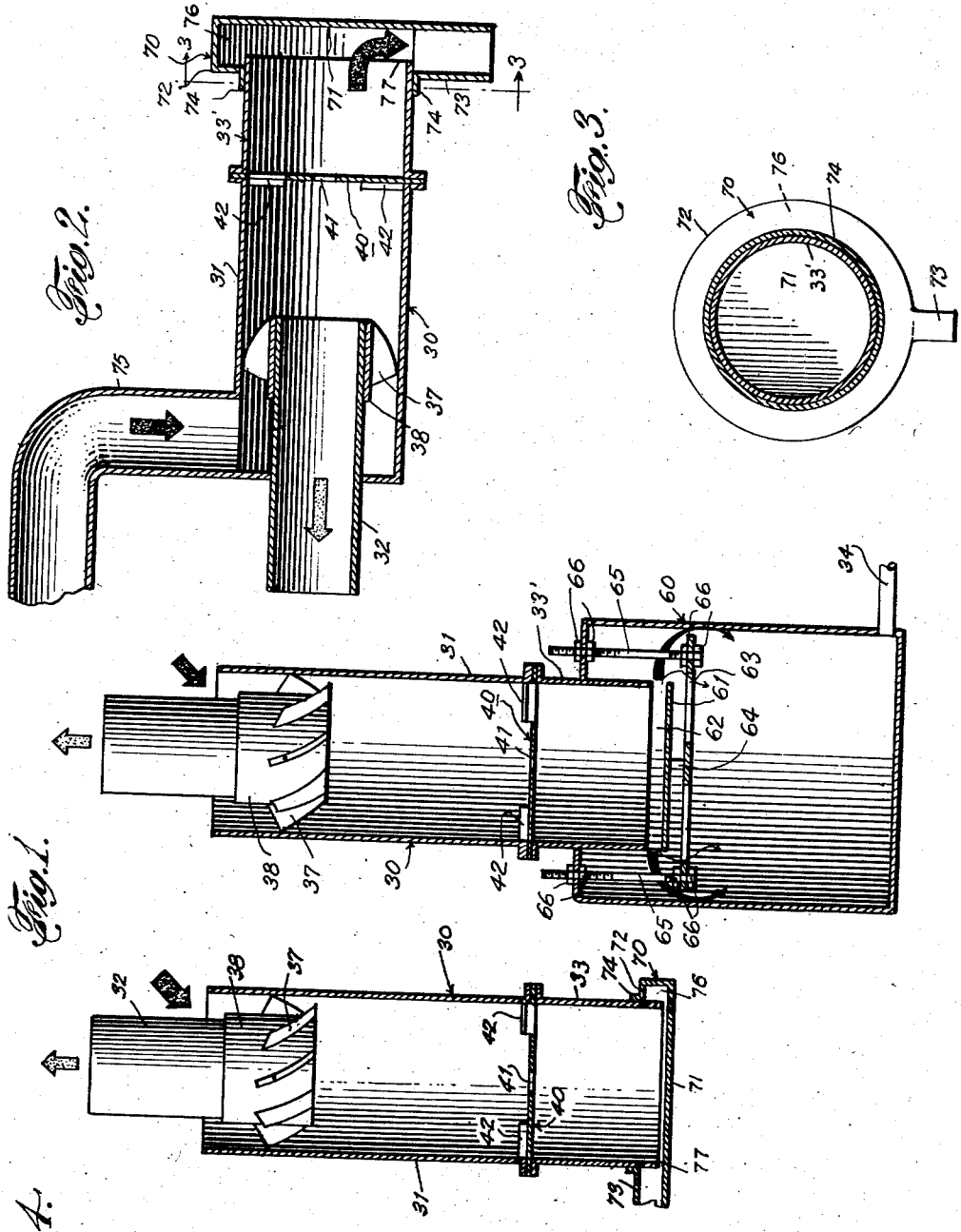

2,812,828

REVERSE FLOW VORTICAL WHIRL SEPARATORS WITH CHAMBERED PNEUMATIC BLOWDOWN MEANS FOR CONTINUOUS REMOVAL OF SEPARATED PARTICLES

John I. Yellott, New York, N. Y., and Peter R. Broadley, Elizabeth, N. J., assignors to Bituminous Coal Research, Inc., Washington, D. C., a corporation of Delaware Application February 7, 1955, Serial No. 486,556

3 Claims. (Cl. 183—80)

This invention relates to pressure-sustaining, reverse flow vortical whirl separators of the vortex reflector type, incorporating means for the continuous pneumatic blowdown and removal of separated particles from the separators in fractional amounts of the particle-bearing gasiform fluid being processed. More particularly, the invention is directed to improved continuous blowdown type separators characterized by the interposition of chamber means between a separator barrel and a blowdown line discharging to storage and/or disposal means, the chamber means being in free fluid communication with both the separator barrel and the associated blowdown line.

This application is a continuation in part of our application Serial No. 257,702, filed November 23, 1951, for Vortical Whirl Separator and Method of Operation, which novel, continuous pneumatic blowdown type, pressure-sustaining, reverse flow vortical whirl separators, we designate generally by the trade name of "Dunlab Tube."

As set out and claimed in our said parent application, supra, the trademark "Dunlab Tube" has been adopted by us to designate our improved separators in which particulate material is separated from entraining gasiform fluids, with continuous removal of the particulate material, as separated, in blowdown streams comprising minute fractional portions of the gasiform fluid.

Our "Dunlab Tubes," as set forth and illustrated in our said parent application, are susceptible of a number of modifications, the essential and controlling feature of all types being the separation of particulate matter from a spinning or vortically whirling carrier gas stream, with the reverse flow return of cleaned gas, and the continuous pneumatic removal of the separated particulate matter, as separated, in blowdown streams comprised of relatively small fractions (0.5–10%) of the original gas stream.

The present application is directed to a special form of separated particulate matter discharge means, essentially comprised of an annular chamber or bustle disposed exteriorly of a separator barrel, with which it is in free fluid communication through an annular slot whose gap width is ≦ the average particle size of reduced particulate material to be removed through a blowdown line in a blowdown stream of the carrier gas. The blowdown line may be radially or tangentially embouched in the outer wall of the annular chamber.

The gap or annular slot, as will appear more fully hereinafter, may be formed by and between the bottom edge of a separator barrel and a spacedly apposed flat disk or plate, which may be separately mounted, or may form an integral bottom for both the separator and the annular chamber. The improvements of the present invention being particularly related to the separated solids discharge and removal end of a "Dunlab Tube" type separator, the details of the separation of the particulate matter in the barrel of a separator will not be gone into, save to indicate one method of primary separation of the particles from the entraining spinning stream of gasiform fluid.

It is, therefore, among the features of novelty and advantage of the present invention to provide novel "Dunlab Tube" type, pressure-sustaining, reverse flow vortical whirl separators, with continuous pneumatic blowdown means for removal of separated particulate matter, the blowdown means incorporating chambers in free fluid communication with the separators through annular gap entrants.

Another feature of novelty and advantage of this invention is to provide open-ended separator barrels encased in closed housings and opening into the housings through peripheral slots, the housings being provided with blowdown lines.

A further feature of novelty and advantage of this invention is to provide gap-forming means for spaced apposition to the open bottoms of reverse flow vortical whirl separators, the said means being either integral with housing encasing said open bottoms, or spacedly maintained in separate housings, all of said housings incorporating blowdown lines, and the gap-forming means defining peripheral slots opening into the housings from the separators.

Other features of novelty and advantage of this invention include the provision of annular blowdown chambers for pressure-sustaining, reverse flow vortical whirl separators having blowdown lines embouched in the blowdown chambers.

With these and other objects in view, which may be incident to our improvements, the invention consists in the parts and combinations to be hereinafter set forth and claimed, with the understanding that the several necessary elements, comprising our invention, may be varied in construction, proportions and arrangement, without departing from the spirit and scope of the appended claims.

In order to make our invention more clearly understood, we have shown in the accompanying drawings means for carrying the same into practical effect, without limiting the improvements in their useful applications to the particular constructions, which for the purpose of explanation, have been made the subject of illustration.

In the drawings, like numerals refer to similar parts throughout the several views, of which—

Figure 1 is a vertical section through an open-bottomed, reverse flow vortical whirl separator with an adjustable flat bottom or vortex reflector spacedly apposed to the separator and defining an annular peripheral gap therewith providing free-falling discharge to a collecting hopper having a pneumatic blowdown line embouched therein;

Fig. 2 is a vertical section through a horizontally mounted reverse flow vortical whirl separator tube adapted for heavy loading and incorporating the vortex reflector principle with a gap-forming cap member defining an annular peripheral blowdown chamber with the tube, and the chamber mounting a radially embouched pneumatic blowdown tube;

Fig. 3 is a transverse cross-section taken on line 3—3 of Fig. 2, and

Fig. 4 is a vertical section, partly in elevation, of a pressure-sustaining, reverse flow vortical whirl separator having a spinner inlet, an axial cleaned air return pipe, primary and secondary separator chambers separated by an annular disk having peripheral skimmer blades, the secondary chamber discharging through an annular slot into an annular blowdown chamber embodying a radial blowdown line.

The incorporation of the pneumatic discharge blowdown principle in the novel reverse flow vortical whirl separators herein permits the handling of particle-containing, high pressure and high temperature (1500° F.) gas streams, and the removal of the contained particles from the separators by utilizing from 1 to 10% of the gas stream as a blowdown stream, thereby eliminating mechanical ash removing equipment from the system. The vortical whirl separators herein are capable of functioning as self-sustaining pressure vessels, thereby permitting their use in locomotive power plants, where appreciable and important reductions in size and weight of ash removal equipment can be effected, all as more particularly set out and claimed in our companion application Serial No. 330,077 filed January 7, 1953, for Coal-Burning Gas Turbine Power Plants Incorporating Novel Self-Supporting and Pressure-Sustaining Vortical Whirl Separators Together With Improved Ash Quenching and Blowdown Means.

In the elaboration of our studies on the functioning of the novel vortical whirl separators hereinabove described, and with particular reference to the removal of separated particulate matter by asportation in blowdown streams of the gasiform fluid under treatment, particular attention was directed to the orientation and functioning of the blowdown lines. In the course of this phase of our researches, a novel discovery was made, namely, that if a continuous annular slot is provided at the discharge end of the discharge chamber or secondary separator, and this end of the separator is encased in an air-tight receiving chamber, the ash-separation efficiency of the novel vortical whirl separators herein is appreciably increased. This wholly unexpected increase in separation efficiency of the separators herein was found to be independent of the blowdown lines, and to be a function solely of the slot width, as applied to a given set of operating conditions. Because of the apparent modus operandi of the novel discovery referred to, we have designated it as the "vortex reflector principle," for purposes of ready identification. In the practical application of this principle to the novel vortical whirl separators herein, the separators illustrated, in part, in Figs. 1 and 2 were constructed and successfully operated on a full scale basis. Turning now to these figures of the drawings, the vortical whirl separators herein, incorporating our novel "vortex reflector principle" will be described:

As shown in Fig. 1, a vortical whirl separator 30 is provided with the usual primary separator or barrel section 31, diaphragm skimmer plate 40, and an open ended discharge or secondary separator section 33'. The section 33' serves to support an air-tight, bottomed casing 60, disposed therearound. As shown, the casing may be provided with a blowdown line 34, or the usual air-tight hopper discharge, not shown. A vortex reflector plate 61 is spacedly supported in juxtaposition to the open end of discharge section 33' to define an annular gap or slot 62, of variable gap width therewith. The plate 61 extends across the open end of section 33' and is secured to and on a spider 63 by a post 64. The spider is fixedly held in position by spacer rods 65, which are locked in place by nuts threaded thereon, and designated generally by the numeral 66. The slot width can be varied, and, desirably, is of such a magnitude that coarse particles or agglomerates are retained in the discharge or secondary separator chamber until they are ground down by attrition against the wall of the separator as a result of the continuous vortical whirl to which they are subjected.

The reverse flow vortical whirl separators described hereinabove, while intended primarily for use in presurized combustion systems of gas turbine power plants burning powdered coal, are susceptible of use in all installations where high throughputs of particle-laden gasiform fluids are to be cleaned. A special feature of the invention herein is the application of the "vortex reflector principle" to novel vortical whirl separators used as discharge nozzles for pneumatic transport systems for pulverulent materials. Materials which are handled most expeditiously by pneumatic transport include, inter alia, powdered coal, iron ore, gypsum, and the like. Referring to Figs. 2 and 3, the principles of the invention herein are seen embodied in a novel delivery and separating device for the separation and discharge of pulverulent materials from pneumatic carrier fluids. In this form of the invention, the usual separator 30 is provided with an open-ended discharge chamber or secondary separator section 33', which end is capped by a special discharge device, designated generally by the numeral 70. The device 70 has a plate section 71, serving as a "vortex reflector," a collar section 72, and a discharge spout 73. The collar 72 has an inturned flange 74 in air-tight engagement with the open end of secondary separator section 33'. The device 70 is hermetically secured on and over the section 33' of the separator tube, and defines an annular blowdown chamber 76 therewith, which discharges through member 73 as a pneumatic blowdown line. The annular gap 77 formed by and between the open end of section 33' and plate section 71 of member 70, may be varied, as noted hereinabove. The inlet end of the primary separator section is closed, as shown, and particle-laden pneumatic fluid is introduced tangentially into the separator through an angular connection 75. The connection 75 may be connected to any suitable conduit, not shown, for the pneumatic transport of pulverulent material. In use, and depending on the size of the installation, the device may be suspended from a crane or boom, or manipulated by hand, and the discharge nozzle 73 traversed to insure even deposit and trimming of deposited solids. The cleaned gas return pipe 32 may be vented to the atmosphere, where the solids being handled do not constitute a health or fire hazard. In case flammable or otherwise obnoxious discrete solids are being handled, the cleaned gas return 32 may be connected, in a closed circuit, with the impeller pump or fan whose discharge is in fluid communication with inlet pipe 75, and the conveying gas, such as carbon dioxide, nitrogen, or the like, is continuously recirculated, the loss of carrier fluid through the blowdown or discharge nozzle 73 being of the order of 1 to 10% of the total volume of the throughput. Where a closed conveying circuit is used, the receiving space or chamber may be sealed off or otherwise blanketed from the atmosphere.

In the form of the invention shown in Fig. 4, a separator tube 30, as in Fig. 1, is provided with a capped bottom closure defining an annular blowdown chamber therewith, which chamber is provided with the usual blowdown line. The cap closure 70, and blowdown outlet 73, are well suited for this purpose. When the gap spacing 77 has been determined for a particular use, the annular flange 74 is desirably hermetically secured to separator section 33' in any suitable manner, such as welding.

It is to be noted that the novel separators herein also function as classifiers, as the gap width of the annular slot entrants to the discharge or pneumatic blowdown chambers will determine the size of particles passing therethrough. Oversize particles and agglomerates will be retained in the separator until ground down by attrition against the lip of the separator and the spacedly apposed vortex reflector plate.

When the separators are used in batteries, the solids discharge system, as set out in our parent application, supra, will be provided with a critical flow nozzle, not shown, whereby a uniform pressure is maintained in the separators, with no blowback therebetween due to differential discharge pressures in the blowdown lines.

It will be readily apparent that the improved reverse flow vortical whirl separators herein are susceptible of use in a wide variety of industrial and technical installations, a preferred use being the continuous separation and pneumatic removal of combustion residues resulting from the pressurized combustion of pulverized coal in the generation of high temperature motive fluids for gas turbines. A notable characteristic of systems incorporating the novel separators herein is the fact that removal of separated solids in and by a pneumatic disposal system is accomplished by the use of fractional amounts of the carrier fluid for asporting such solids in blowndown streams, thereby eliminating the usual mechanical removal equipment.

While we have shown and described the preferred embodiment of our invention, we wish it to be understood that we do not confine ourselves to the precise details of construction herein set forth by way of illustration, as it is apparent that many changes and variations may be made therein, by those skilled in the art, without departing from the spirit of the invention or exceeding the scope of the appended claims.

What is claimed is:

1. A vortical whirl separator of the character described, comprising a primary separator chamber having inlet means for particle-laden gasiform fluid and an axial outlet for cleaned gasiform fluid at the same end of the chamber, a secondary separator chamber secured to the bottom of said primary chamber, an axially apertured skimmer plate between the chambers, said plate incorporating an axial opening and peripheral openings, whereby axial and peripheral fluid communication is established between said chambers, means for the continuous removal of separated solids from the separator, comprising a vortex reflector apposed to the bottom of the secondary separator chamber and defining an efferent slot therewith, circumjacent blowdown means about said slot and in fluid communication with the secondary chamber through said slot, comprising an annular collar adjustably mounted on the secondary separator, and a blowdown line embouched in said annular collar, whereby the continuous removal of separated solids is pneumatically effected in a blowdown stream of the gas under treatment.

2. A vortical whirl separator of the character described, comprising a primary separator chamber having inlet means for particle-laden gasiform fluid and an axial outlet for cleaned gasiform fluid at the same end of the chamber, a secondary separator chamber secured to the bottom of said primary chamber, an axially apertured skimmer plate between the chambers, said plate incorporating an axial opening and peripheral openings, whereby axial and peripheral fluid communication is established between said chambers, means for the continuous removal of separated solids from the separator, comprising a vortex reflector apposed to the bottom of the secondary separator chamber and defining an efferent slot therewith, circumjacent blowdown means about said slot and in fluid communication with the secondary chamber through said slot, said blowdown means comprising an annular collar mounted on the secondary separator chamber at the base thereof, the vortex reflector being secured to the collar and forming a closed bottom for the separator, said collar defining an annular chamber with the separator and the reflector, and a blowdown line embouched in said annular collar, whereby the continuous removal of separated solids is pneumatically effected in a blowdown stream of the gas under treatment.

3. A vortical whirl separator according to claim 2, characterized by the fact that the vortex reflector is integral with the annular collar, and the collar is slidable on and over the secondary separator chamber, whereby to variably appose the vortex reflector to the bottom edge of the chamber and define an annular slot therewith.

References Cited in the file of this patent

UNITED STATES PATENTS

| | | |
|---|---|---|
| 1,844,369 | Ross | Feb. 9, 1932 |
| 2,069,483 | Skajaa | Feb. 2, 1937 |
| 2,222,930 | Arnold | Nov. 26, 1940 |

FOREIGN PATENTS

| | | |
|---|---|---|
| 176,352 | Switzerland | July 1, 1935 |
| 555,908 | Great Britain | Sept. 13, 1943 |
| 700,791 | Great Britain | Dec. 9, 1953 |
| 956,552 | France | Aug. 15, 1949 |